(12) United States Patent
Alikhani et al.

(10) Patent No.: US 11,361,567 B2
(45) Date of Patent: Jun. 14, 2022

(54) METHODS AND SYSTEMS FOR FACILITATING CLASSIFICATION OF PORTIONS OF A REGULATORY DOCUMENT

(71) Applicant: Catachi Co., San Francisco, CA (US)

(72) Inventors: Kayvan Alikhani, Berkeley, CA (US); Chuan Yun, Santa Clara, CA (US); Mohit Mohan Galvankar, Alameda, CA (US); Mohsen Emaminouri, San Francisco, CA (US)

(73) Assignee: Catachi Co., San Francisco, CA (US)

( * ) Notice: Subject to any disclaimer, the term of this patent is extended or adjusted under 35 U.S.C. 154(b) by 0 days.

(21) Appl. No.: 17/142,758

(22) Filed: Jan. 6, 2021

(65) Prior Publication Data

US 2021/0209355 A1 Jul. 8, 2021

Related U.S. Application Data

(60) Provisional application No. 62/957,595, filed on Jan. 6, 2020.

(51) Int. Cl.
*G06F 16/93* (2019.01)
*G06F 16/28* (2019.01)
(Continued)

(52) U.S. Cl.
CPC .......... *G06V 30/413* (2022.01); *G06F 16/285* (2019.01); *G06F 16/93* (2019.01);
(Continued)

(58) Field of Classification Search
CPC ..... G06N 20/00; G06F 40/103; G06F 40/169; G06F 16/285; G06F 16/93; G06K 9/6256; G06K 9/00456
See application file for complete search history.

(56) References Cited

U.S. PATENT DOCUMENTS

2006/0059137 A1* 3/2006 Walker ................... G06F 16/25
2013/0198596 A1* 8/2013 Angelillo .............. G06F 40/103
715/205

(Continued)

*Primary Examiner* — Stephen S Hong
*Assistant Examiner* — Nicholas Hasty

(57) ABSTRACT

Disclosed herein is a method for facilitating classification of portions of a regulatory document. Accordingly, the method may include receiving, using a communication device, the regulatory document from a device, converting, using a processing device, the regulatory document from a source format to a preferred format, analyzing, using the processing device, the regulatory document of the preferred format based on the converting, identifying, using the processing device, the portions of the regulatory document based on the analyzing, and classifying, using the processing device, the portions using a classifier model into classification codes based on the identifying. Further, the method may include generating, using the processing device, an annotated regulatory document based on the classifying. Further, the method may include transmitting, using the communication device, the annotated regulatory document to the device. Further, the method may include storing, using a storage device, the annotated regulatory document and the classifier model.

14 Claims, 17 Drawing Sheets

(51) Int. Cl.
*G06F 40/103* (2020.01)
*G06F 40/169* (2020.01)
*G06K 9/62* (2022.01)
*G06N 20/00* (2019.01)
*G06V 30/413* (2022.01)

(52) U.S. Cl.
CPC .......... *G06F 40/103* (2020.01); *G06F 40/169* (2020.01); *G06K 9/6256* (2013.01); *G06N 20/00* (2019.01)

(56) References Cited

U.S. PATENT DOCUMENTS

| | | | |
|---|---|---|---|
| 2016/0350885 A1* | 12/2016 | Clark | G06Q 30/0185 |
| 2018/0300323 A1* | 10/2018 | Lee | G06Q 50/184 |
| 2020/0111023 A1* | 4/2020 | Pondicherry Murugappan | G06N 7/005 |
| 2020/0279271 A1* | 9/2020 | Gasperecz | G06Q 30/018 |

* cited by examiner

METHODS AND SYSTEMS FOR FACILITATING CLASSIFICATION OF PORTIONS OF A REGULATORY DOCUMENT

The current application claims a priority to the U.S. Provisional Patent application Ser. No. 62/957,595 filed on Jan. 6, 2020.

FIELD OF THE INVENTION

Generally, the present disclosure relates to the field of data processing. More specifically, the present disclosure relates to methods and systems for facilitating classification of portions of a regulatory document.

BACKGROUND OF THE INVENTION

Classification is technologically important to several industries, businesses, and organizations in the field of data processing. Further, the classification may be supervised learning. Further, classification is the process of identifying a class/category of a given observation based on a classifier model. Further, the classifier model may be trained based on training with a set of observations with a known class.

Existing techniques for facilitating the classification of portions of a regulatory document are deficient with regard to several aspects. For instance, current technologies do not reliably classify a complex document (such as a regulatory document).

Therefore, there is a need for improved methods and systems for facilitating classification of portions of a regulatory document that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating classification of portions of a regulatory document, in accordance with some embodiments. Accordingly, the method may include a step of receiving, using a communication device, the regulatory document from at least one device. Further, the regulatory document may be associated with a structure. Further, the structure may include a layout of content of the regulatory document. Further, the layout may include at least one of an indent and a white space associated with the portions of the regulatory document. Further, the regulatory document may be associated with a source format. Further, the method may include a step of converting, using a processing device, the regulatory document from the source format to a preferred format. Further, the method may include a step of analyzing, using the processing device, the regulatory document of the preferred format based on the converting. Further, the method may include a step of identifying, using the processing device, a plurality of portions of the regulatory document based on the analyzing. Further, the method may include a step of classifying, using the processing device, the plurality of portions using a classifier model into a plurality of classification codes based on the identifying. Further, the classifying of the plurality of portions may be based on the at least one of the indent and the white space associated with the plurality of portions. Further, the method may include a step of generating, using the processing device, an annotated regulatory document based on the classifying. Further, the annotated regulatory document may include the plurality of portions and the plurality of classification codes associated with the plurality of portions. Further, the method may include a step of transmitting, using the communication device, the annotated regulatory document to the at least one device. Further, the method may include a step of storing, using a storage device, the annotated regulatory document and the classifier model.

Further disclosed herein is a system for facilitating classification of portions of a regulatory document, in accordance with some embodiments, Accordingly, the system may include a communication device configured for receiving the regulatory document from at least one device. Further, the regulatory document may be associated with a structure. Further, the structure may include a layout of content of the regulatory document. Further, the layout may include at least one of an indent and a white space associated with the portions of the regulatory document. Further, the regulatory document may be associated with a source format. Further, the communication device may be configured for transmitting an annotated regulatory document to the at least one device. Further, the system may include a processing device communicatively coupled with the communication device. Further, the processing device may be configured for converting the regulatory document from the source format to a preferred format. Further, the processing device may be configured for analyzing the regulatory document of the preferred format based on the converting. Further, the processing device may be configured for identifying a plurality of portions of the regulatory document based on the analyzing. Further, the processing device may be configured for classifying the plurality of portions using a classifier model into a plurality of classification codes based on the identifying. Further, the classifying of the plurality of portions may be based on the at least one of the indent and the white space associated with the plurality of portions. Further, the processing device may be configured for generating the annotated regulatory document based on the classifying. Further, the annotated regulatory document may include the plurality of portions and the plurality of classification codes associated with the plurality of portions. Further, the system may include a storage device communicatively coupled with the processing device. Further, the storage device may be configured for storing the annotated regulatory document and the classifier model.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
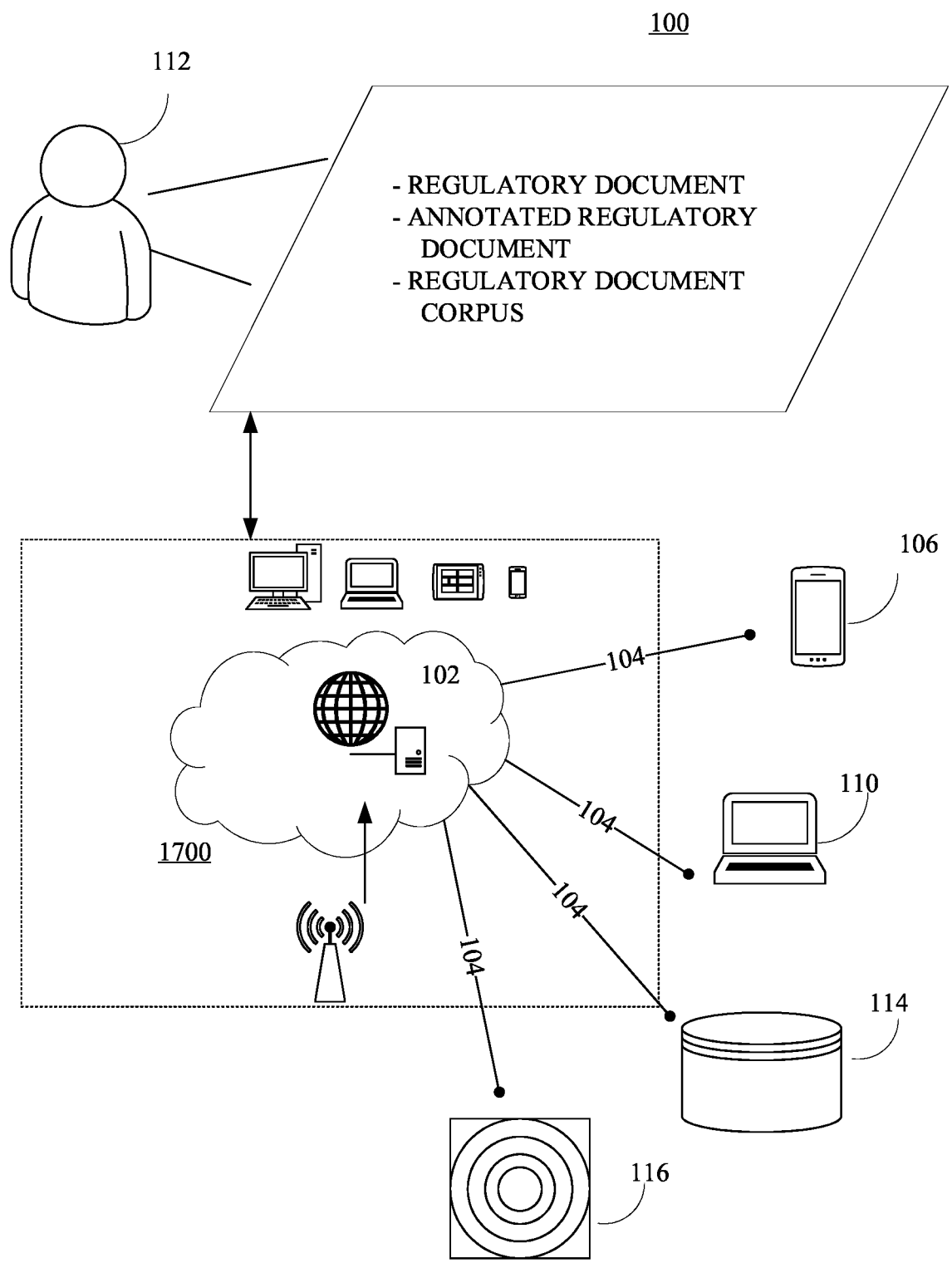
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating classification of portions of a regulatory document, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for facilitating the classification of portions of a regulatory document. Further, the disclosed system may automatically extract and classify violations, penalties, and respondents from regulatory enforcement action documents using Recurrent Neural Network (RNN) and automatic Machine Learning (ML) based sentencification. Further, the disclosed system may process the regulatory document through a RNN model to extract sentences/paragraphs to classify them (rank/rate) as enforcement action violations, penalties (currency), or respondent (business/entity). Further, the regulatory document is complex in structure. Further, the structure of the regulatory document may include a layout that may include white spaces and indentations that may be significant for the regulatory document. Further, classification of the regulatory document may be associated with classifying portions of the regulatory document and assigning a plurality of classification codes (such as enforcement action violations, penalties (currency), and respondent).

Referring now to figures, FIG. 1 is an illustration of an online platform 100 consistent with various embodiments of the present disclosure. By way of non-limiting example, the online platform 100 to facilitate classification of portions of a regulatory document may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1700.

Figure 2:
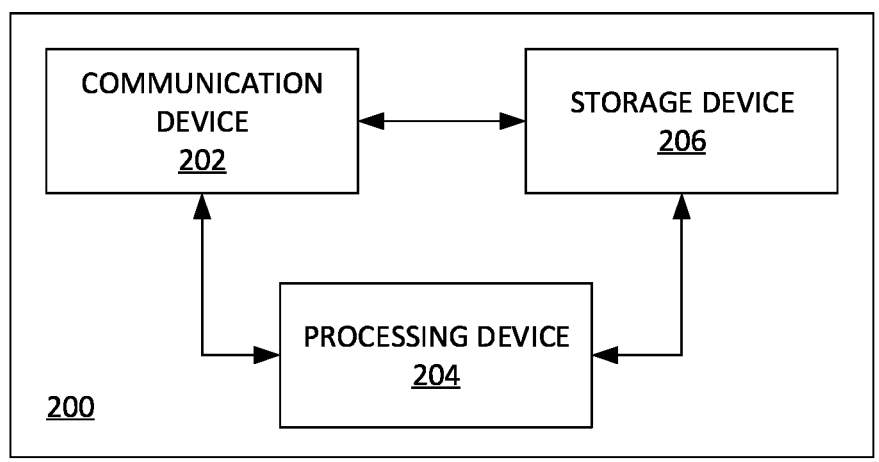
FIG. 2 is a block diagram of a system for facilitating classification of portions of a regulatory document, in accordance with some embodiments.

FIG. 2 is a block diagram of a system 200 for facilitating classification of portions of a regulatory document, in accordance with some embodiments. Accordingly, the system 200 may include a communication device 202 configured for receiving the regulatory document from at least one device. Further, the regulatory document may be associated with a structure. Further, the structure may include a layout of content of the regulatory document. Further, the layout may include at least one of an indent and a white space associated with the portions of the regulatory document. Further, the regulatory document may be associated with a source format. Further, the communication device 202 may be configured for transmitting an annotated regulatory document to the at least one device. Further, the content may include textual content.

Further, the system 200 may include a processing device 204 communicatively coupled with the communication device 202. Further, the processing device 204 may be configured for converting the regulatory document from the source format to a preferred format. Further, the processing device 204 may be configured for analyzing the regulatory document of the preferred format based on the converting. Further, the processing device 204 may be configured for identifying a plurality of portions of the regulatory document based on the analyzing. Further, the processing device 204 may be configured for classifying the plurality of portions using a classifier model into a plurality of classification codes based on the identifying. Further, the classifying of the plurality of portions may be based on the at least one of the indent and the white space associated with the plurality of portions. Further, the processing device 204 may be configured for generating the annotated regulatory document based on the classifying. Further, the annotated regulatory document may include the plurality of portions and the plurality of classification codes associated with the plurality of portions.

Further, the system 200 may include a storage device 206 communicatively coupled with the processing device 204. Further, the storage device 206 may be configured for storing the annotated regulatory document and the classifier model.

Further, in some embodiments, the plurality of classification codes may include at least two of a title, a section heading, a section, a sub-section heading, and a sub-section.

Further, in some embodiments, the processing device 204 may be further configured for training the classifier model based on a sample corpus of regulatory documents. Further, the classifier model may include a machine learning model. Further, the classifier model may be configured for classifying the plurality of portions based on the training.

Further, the processing device 204 may be configured for analyzing the annotated regulatory document based on the generating. Further, the annotated regulatory document may include the plurality of portions and the plurality of classification codes associated with the plurality of portions. Further, the processing device 204 may be configured for identifying the plurality of classification codes associated with the plurality of portions based on the analyzing of the annotated regulatory document. Further, the processing device 204 may be configured for generating a plurality of visual indicators for the plurality of classification codes based on the identifying of the plurality of classification codes. Further, the processing device 204 may be configured for applying the plurality of visual indicators to the plurality of portions based on the plurality of classification codes of the plurality of portions. Further, the processing device 204 may be configured for generating a visually annotated regulatory document based on the applying. Further, the communication device 202 may be further configured for transmitting the visually annotated regulatory document to the at least one device. Further, the at least one device may be configured for presenting the visually annotated regulatory document.

Further, in some embodiments, the communication device 202 may be configured for receiving at least one feedback associated with at least one classification code of at least one portion of the plurality of portions from the at least one device based on the transmitting of the visually annotated regulatory document. Further, the processing device 204 may be configured for modifying the at least one classification code of the at least one portion based on the at least one feedback, Further, the processing device 204 may be configured for generating at least one modified classification code for the at least one portion based on the modifying, Further, the processing device 204 may be configured for generating a modified annotated regulatory document based on the generating of the at least one modified classification code. Further, the storage device 206 may be configured for storing the modified annotated regulatory document.

Further, in some embodiments, the processing device 204 may be configured for retraining the classifier model based on the at least one feedback. Further, the classifier model may be configured for classifying the plurality of portions based on the retraining.

Further, in some embodiments, the communication device 202 may be configured for receiving a plurality of regulatory document corpus from a plurality of document source devices. Further, the processing device 204 may be configured for analyzing the plurality of regulatory document corpus. Further, the processing device 204 may be configured for generating a plurality of classifier models based on the analyzing of the plurality of regulatory document corpus. Further, the storage device 206 may be configured for storing the plurality of classifier models.

Further, in some embodiments, the processing device 204 may be configured for identifying the classifier model of the plurality of classifier models based on the analyzing of the regulatory document. Further, the classifying of the plurality of portions using the classifier model into the plurality of classification codes may be further based on the identifying of the classifier model.

Further, in some embodiments, the white space may include one or more characters representing at least one of a horizontal space and a vertical space in a typography of the regulatory document.

Further, in some embodiments, the communication device 202 may be configured for receiving at least one first feedback associated with the annotated regulatory document from the at least one device based on the transmitting of the annotated regulatory document. Further, the processing device 204 may be configured for analyzing the at least one first feedback. Further, the processing device 204 may be configured for modifying the classifier model based on the analyzing of the at least one first feedback. Further, the processing device 204 may be configured for generating a refined classifier model based on the modifying. Further, the refined classifier model may be configured for classifying the regulatory document with a higher classification accuracy as compared to a classifying accuracy of the classifier model. Further, the storage device 206 may be further configured for storing the refined classifier model.

Figure 3:
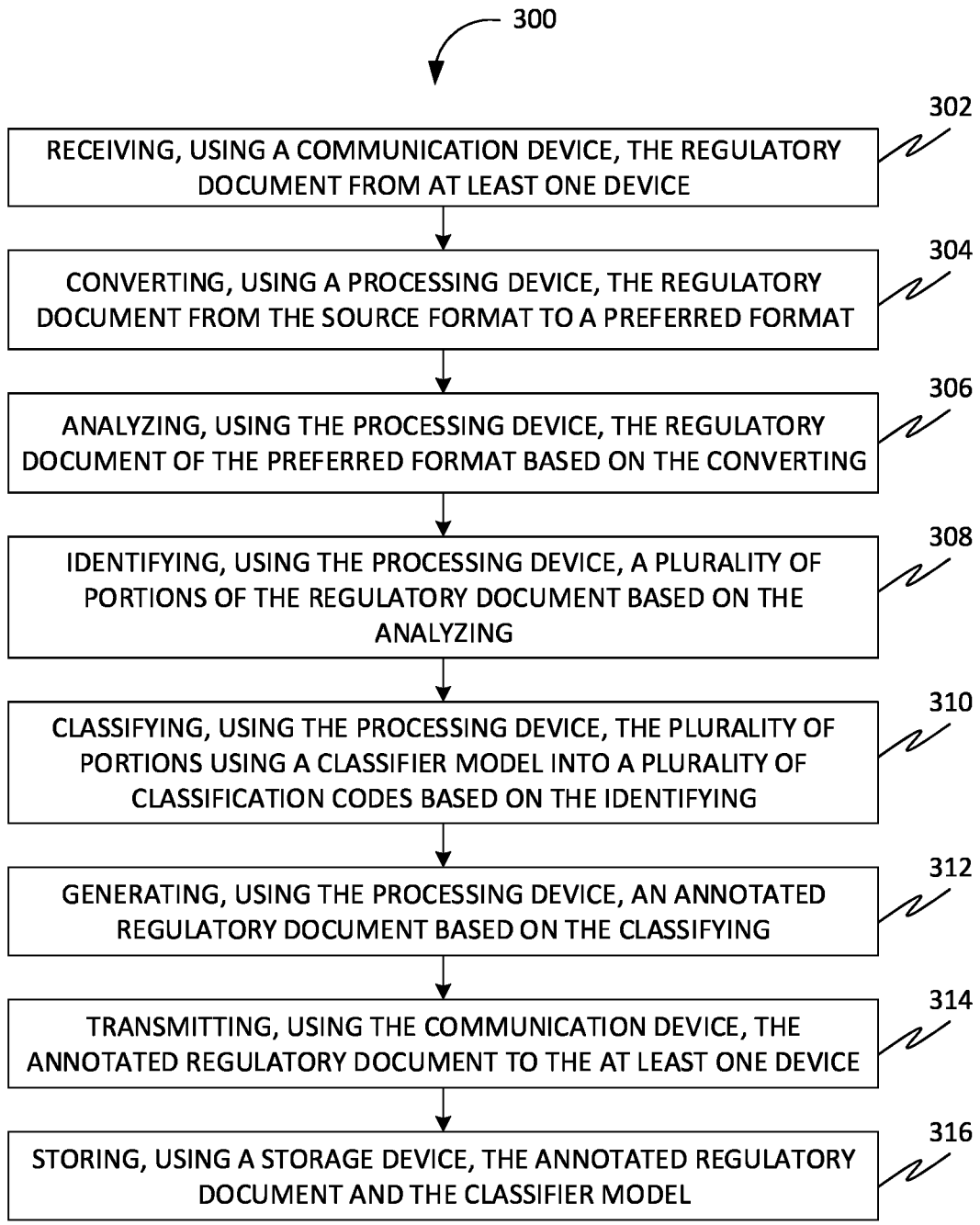
FIG. 3 is a flowchart of a method for facilitating classification of portions of a regulatory document, in accordance with some embodiments.

FIG. 3 is a flowchart of a method 300 for facilitating classification of portions of a regulatory document, in accordance with some embodiments. Accordingly, at 302, the method 300 may include a step of receiving, using a communication device, the regulatory document from at least one device. Further, the regulatory document may be associated with a structure. Further, the structure may include a layout of content of the regulatory document. Further, the layout may include at least one of an indent and a white space associated with the portions of the regulatory document. Further, the regulatory document may be associated with a source format. Further, the content may include textual content. Further, the indent may include a text-indent. Further, the portions may include portions of the textual content.

Further, at 304, the method 300 may include a step of converting, using a processing device, the regulatory document from the source format to a preferred format.

Further, at 306, the method 300 may include a step of analyzing, using the processing device, the regulatory document of the preferred format based on the converting.

Further, at 308, the method 300 may include a step of identifying, using the processing device, a plurality of portions of the regulatory document based on the analyzing.

Further, at 310, the method 300 may include a step of classifying, using the processing device, the plurality of portions using a classifier model into a plurality of classification codes based on the identifying. Further, the classifying of the plurality of portions may be based on the at least one of the indent and the white space associated with the plurality of portions.

Further, at 312, the method 300 may include a step of generating, using the processing device, an annotated regulatory document based on the classifying. Further, the annotated regulatory document may include the plurality of portions and the plurality of classification codes associated with the plurality of portions.

Further, at 314, the method 300 may include a step of transmitting, using the communication device, the annotated regulatory document to the at least one device.

Further, at 316, the method 300 may include a step of storing, using a storage device, the annotated regulatory document and the classifier model.

Further, in some embodiments, the plurality of classification codes may include at least two of a title, a section heading, a section, a sub-section heading, and a sub-section.

Further, in some embodiments, the method 300 may include a step of training, using the processing device, the classifier model based on a sample corpus of regulatory documents. Further, the classifier model may include a machine learning model. Further, the classifier model may be configured for classifying the plurality of portions based on the training.

Further, in some embodiments, the white space may include one or more characters representing at least one of a horizontal space and a vertical space in a typography of the regulatory document.

Figure 4:
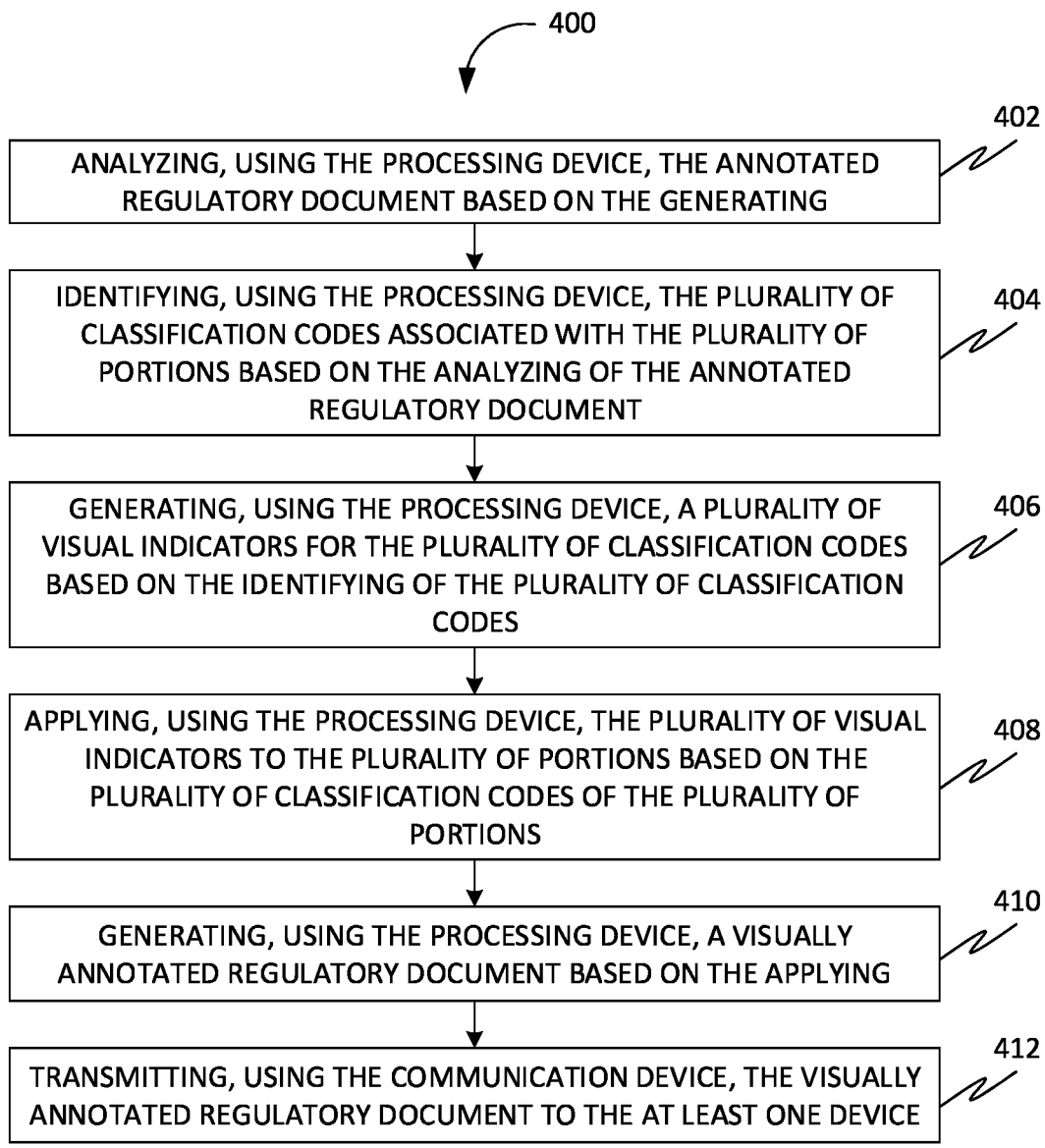
FIG. 4 is a flowchart of a method for generating a visually annotated regulatory document for facilitating the classification of the portions of the regulatory document, in accordance with some embodiments.

FIG. 4 is a flowchart of a method 400 for generating a visually annotated regulatory document for facilitating the classification of the portions of the regulatory document, in accordance with some embodiments. Accordingly, at 402, the method 400 may include a step of analyzing, using the processing device, the annotated regulatory document based on the generating. Further, the annotated regulatory document may include the plurality of portions and the plurality of classification codes associated with the plurality of portions.

Further, at 404, the method 400 may include a step of identifying, using the processing device, the plurality of classification codes associated with the plurality of portions based on the analyzing of the annotated regulatory document.

Further, at 406, the method 400 may include a step of generating, using the processing device, a plurality of visual indicators for the plurality of classification codes based on the identifying of the plurality of classification codes.

Further, at 408, the method 400 may include a step of applying, using the processing device, the plurality of visual indicators to the plurality of portions based on the plurality of classification codes of the plurality of portions.

Further, at 410, the method 400 may include a step of generating, using the processing device, a visually annotated regulatory document based on the applying.

Further, at 412, the method 400 may include a step of transmitting, using the communication device, the visually annotated regulatory document to the at least one device. Further, the at least one device may be configured for presenting the visually annotated regulatory document.

Figure 5:
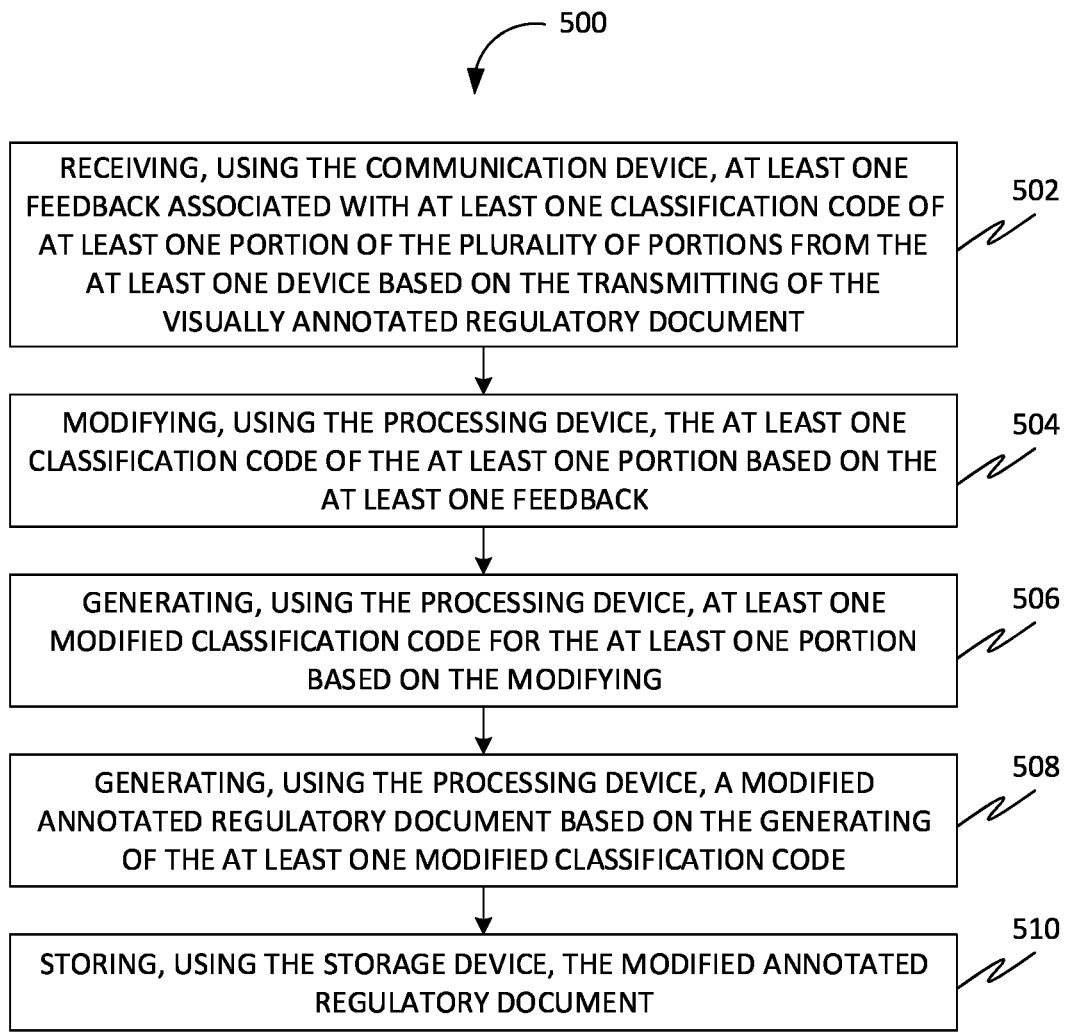
FIG. 5 is a flowchart of a method for generating a modified annotated regulatory document for facilitating the classification of the portions of the regulatory document, in accordance with some embodiments.

FIG. 5 is a flowchart of a method 500 for generating a modified annotated regulatory document for facilitating the classification of the portions of the regulatory document, in accordance with some embodiments. Accordingly, at 502, the method 500 may include a step of receiving, using the communication device, at least one feedback associated with at least one classification code of at least one portion of the plurality of portions from the at least one device based on the transmitting of the visually annotated regulatory document.

Further, at 504, the method 500 may include a step of modifying, using the processing device, the at least one classification code of the at least one portion based on the at least one feedback.

Further, at 506, the method 500 may include a step of generating, using the processing device, at least one modified classification code for the at least one portion based on the modifying.

Further, at 508, the method 500 may include a step of generating, using the processing device, a modified annotated regulatory document based on the generating of the at least one modified classification code.

Further, at 510, the method 500 may include a step of storing, using the storage device, the modified annotated regulatory document.

Further, the method 500 may include a step of retraining, using the processing device, the classifier model based on the at least one feedback. Further, the classifier model may be configured for classifying the plurality of portions based on the retraining.

Figure 6:
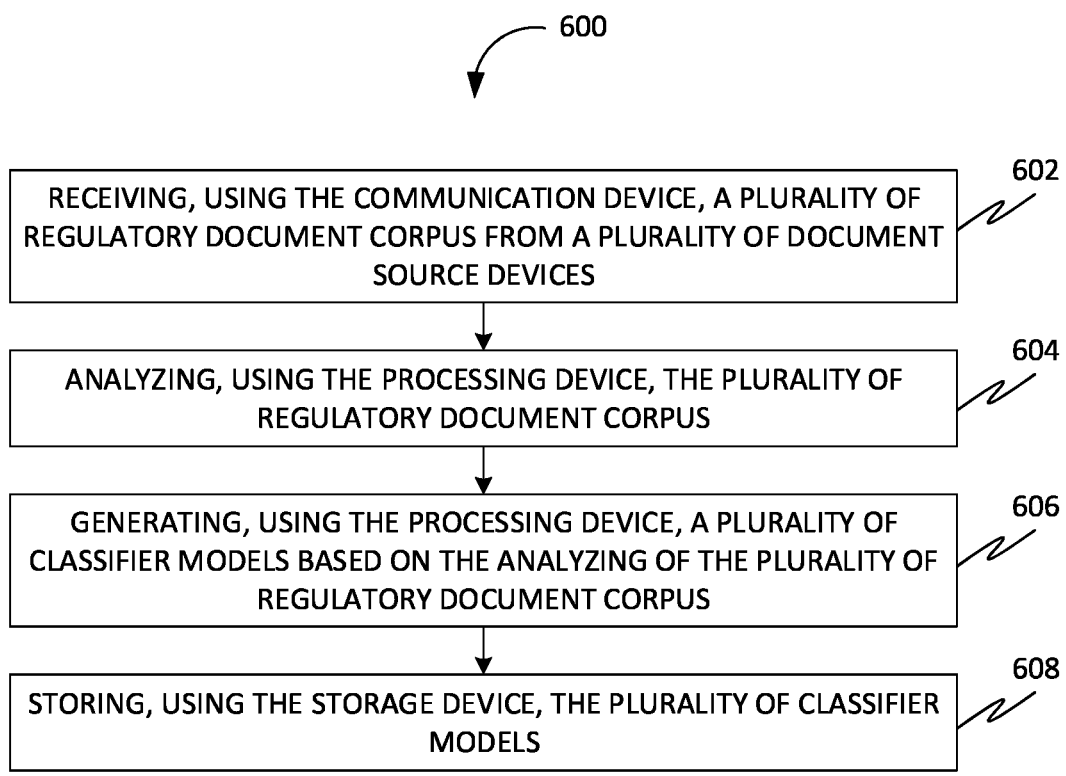
FIG. 6 is a flowchart of a method for generating a plurality of classifier models for facilitating the classification of the portions of the regulatory document, in accordance with some embodiments.

FIG. 6 is a flowchart of a method 600 for generating a plurality of classifier models for facilitating the classification of the portions of the regulatory document, in accordance with some embodiments. Accordingly, at 602, the method 600 may include a step of receiving, using the communication device, a plurality of regulatory document corpus from a plurality of document source devices.

Further, at 604, the method 600 may include a step of analyzing, using the processing device, the plurality of regulatory document corpus.

Further, at 606, the method 600 may include a step of generating, using the processing device, a plurality of classifier models based on the analyzing of the plurality of regulatory document corpus.

Further, at 608, the method 600 may include a step of storing, using the storage device, the plurality of classifier models.

Further, the method 600 may include a step of identifying, using the processing device, the classifier model of the plurality of classifier models based on the analyzing of the regulatory document. Further, the classifying of the plurality of portions using the classifier model into the plurality of classification codes may be further based on the identifying of the classifier model.

Figure 7:
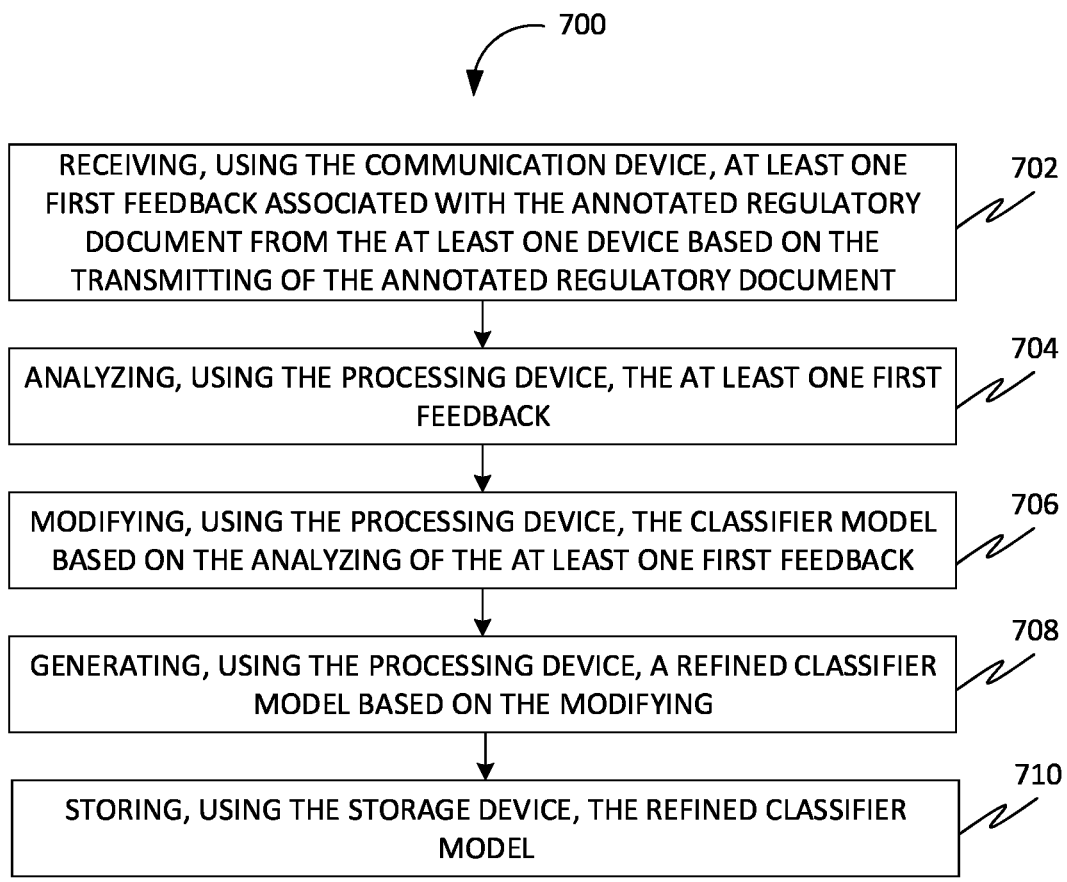
FIG. 7 is a flowchart of a method for generating a refined classifier model for facilitating the classification of the portions of the regulatory document, in accordance with some embodiments.

FIG. 7 is a flowchart of a method 700 for generating a refined classifier model for facilitating the classification of the portions of the regulatory document, in accordance with some embodiments. Accordingly, at 702, the method 700 may include a step of receiving, using the communication device, at least one first feedback associated with the annotated regulatory document from the at least one device based on the transmitting of the annotated regulatory document.

Further, at 704, the method 700 may include a step of analyzing, using the processing device, the at least one first feedback.

Further, at 706, the method 700 may include a step of modifying, using the processing device, the classifier model based on the analyzing of the at least one first feedback.

Further, at 708, the method 700 may include a step of generating, using the processing device, a refined classifier model based on the modifying. Further, the refined classifier model may be configured for classifying the regulatory document with a higher classification accuracy as compared to a classifying accuracy of the classifier model.

Further, at 710, the method 700 may include a step of storing, using the storage device, the refined classifier model.

Figure 8:
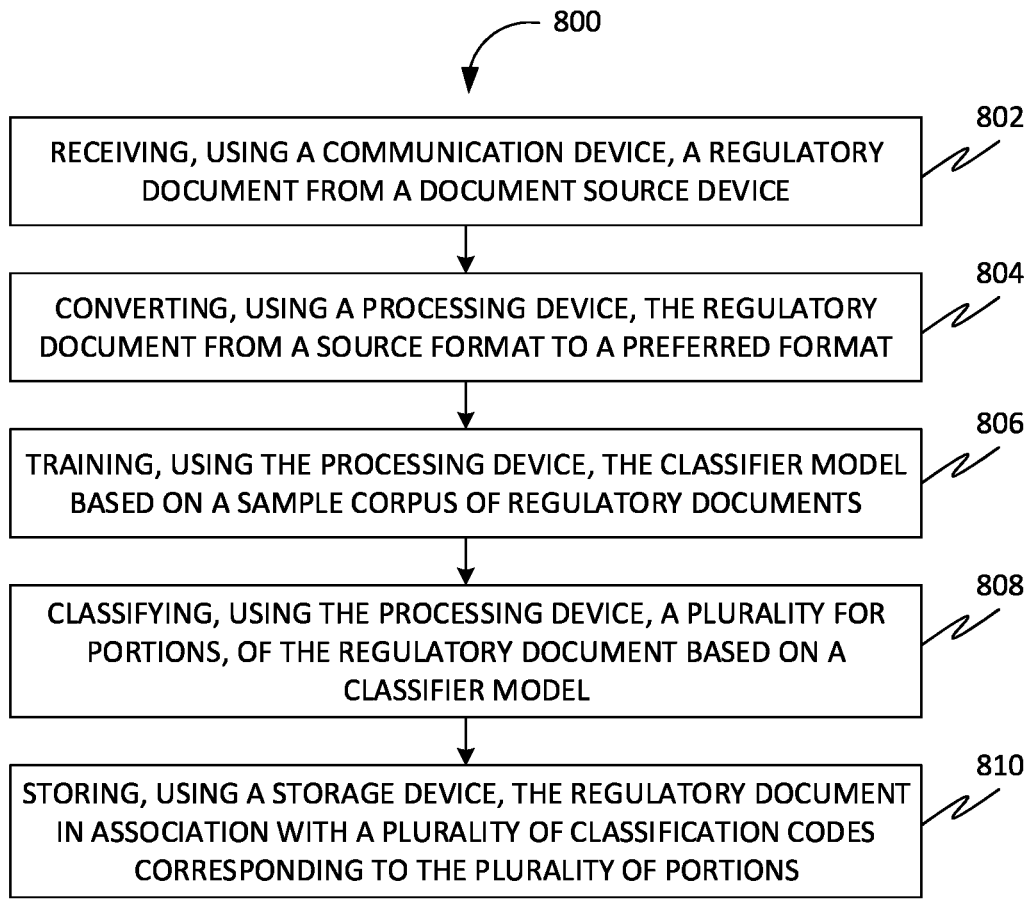
FIG. 8 is a flowchart of a method to facilitate assigning classification codes to portions of a regulatory document based on structure of the regulatory document, in accordance with some embodiments.

FIG. 8 is a flowchart of a method 800 to facilitate assigning of classification codes to portions of a regulatory document based on structure of the regulatory document, in accordance with some embodiments. Accordingly, at 802, the method 800 may include a step of receiving, using a communication device, a regulatory document from a document source device. Further, the regulatory document may be associated with a regulatory authority. Further, the regulatory document may include a dossier, an application, a modification, a filing, and so on. Further, the regulatory document may be associated with a structure. Further, the structure may include a layout of textual content. Further, the layout may be associated with the text indentation of the regulatory document. Further, the regulatory authority may include an institution and an organization that may enforce regulations associated with occupation, health, safety, technology, etc. Further, the document source device may be associated with the regulatory authority that may include a document repository (such as a server, a database 114). Further, the document source device may include a smartphone, a mobile, a tablet, a laptop, a computer, and so on that may be used by a user to upload the regulatory document. Further, the user may include an individual, an institution, and an organization that may want to classify the regulatory document.

Further, at 804, the method 800 may include a step of converting, using a processing device, the regulatory document from a source format to a preferred format. Further, the regulatory document may be associated with the source format. Further, the source format may include a .PDF, .CSV, etc. Further, the preferred format may include a format that may be compatible for processing by the processing device, Further, the preferred format may include a .HTML, .DOC, etc.

Further, at 806, the method 800 may include a step of training, using the processing device, the classifier model based on a sample corpus of regulatory documents. Further, the sample corpus of regulatory document may include a collection of regulatory documents associated with the regulatory authority. Further, the classifier model may include a machine learning model that may be configured for classifying the sample corpus of regulatory documents. Further, the classifier model may include a decision tree, a random forest, a gradient-boosted tree, a multilayer perceptron, a one-vs-rest, a Naive Bayes, etc. Further, the classifier model may be trained upon using machine learning algorithms. Further, the machine learning algorithms may include a set of instructions that may be executed by the processing device to train the classifier model.

Further, at 808, the method 800 may include a step of classifying, using the processing device, a plurality of portions of the regulatory document based on a classifier model. Further, the plurality of portions comprises a title, a section heading, a section, a sub-section heading, a sub-section. Further, the plurality of portions may include a word, a sentence, and a paragraph. Further, the at least one of the title, the section heading, the section, the sub-section heading, and the sub-section is characterized by one or more co-located white-spaces. Further, the white spaces may include one or more characters that may represent horizontal or vertical spaces in typography. Further, the one or more characters may include space characters, return characters, etc.

Further, at 810, the method 800 may include a step of storing, using a storage device, the regulatory document in association with a plurality of classification codes corresponding to the plurality of portions. Further, the plurality of classification codes may include a title, a section heading, a section, a sub-section heading, and a sub-section of the regulatory document that may be classified by the classifier model.

Figure 9:
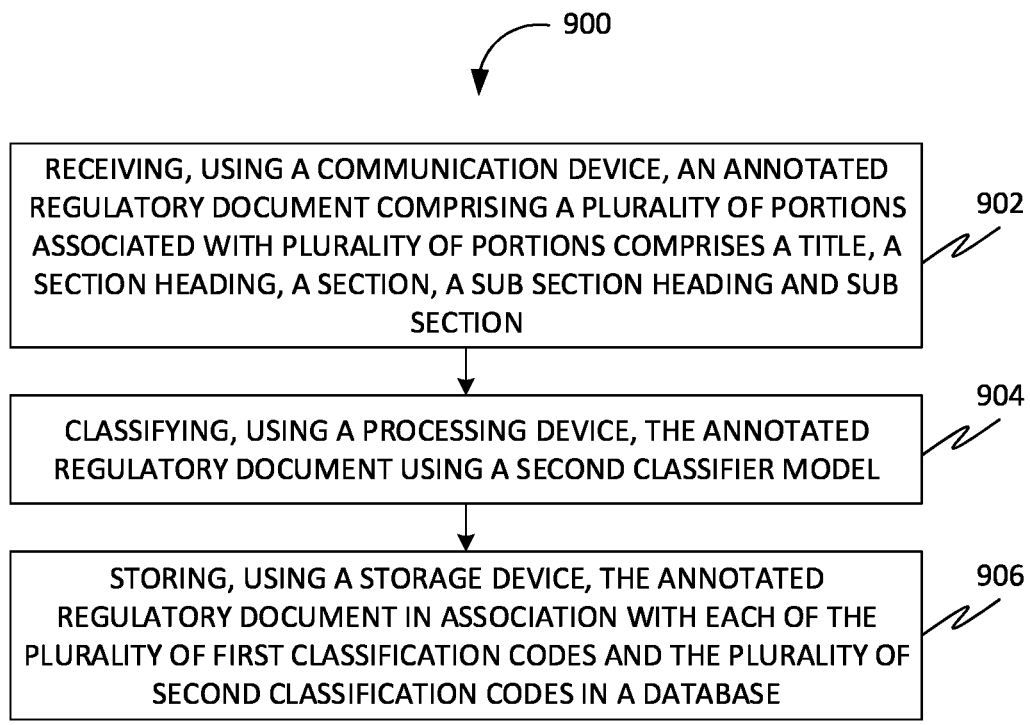
FIG. 9 is a flowchart of a method to facilitate assigning of second classification codes to portions of a regulatory document based on a second classifier model, in accordance with some embodiments.

FIG. 9 is a flowchart of a method 900 to facilitate assigning of second classification codes to portions of a regulatory document based on a second classifier model, in accordance with some embodiments. Accordingly, at 902, the method 900 may include a step of receiving an annotated regulatory document comprising a plurality of portions associated with a plurality of first classification codes. Further, the plurality of portions comprises a title, a section heading, a section, a sub section heading, and a sub section. Further, the annotated regulatory document is generated based on a first classifier model configured for classifying a regulatory document. Further, the annotated regulatory document may include the regulatory document with the plurality of portions associated with a plurality of classification codes. Further, the plurality of portions may include a word, a sentence, and a paragraph. Further, the plurality of first classification codes may include a title, a section heading, a section, a sub-section heading, and a sub-section corresponding to the plurality of portions. Further, the annotated regulatory document may be generated based on a first classifier model. Further, the first classifier model may include a machine learning model that may be configured for classifying the sample corpus of regulatory documents. Further, the first classifier model may include a decision tree, a random forest, a gradient-boosted tree, a multilayer perceptron, a one-vs-rest, a Naive Bayes, etc. Further, the first classifier model may be trained upon using machine learning algorithms. Further, the machine learning algorithms may include a set of instructions that may be executed by the processing device to train the first classifier model.

Further, at 904, the method 900 may include a step of classifying, using a processing device, the annotated regulatory document using a second classifier model. Further, a plurality of second classification codes is associated with the plurality of portions based on the classifying based on the second classifier model. Further, the plurality of second classification codes may include enforcement action violations, penalties (currency), respondents (business/entity), etc. Further, the second classifier model may include a machine learning model that may be configured for classifying the sample corpus of the regulatory documents. Further, the second classifier model may include a decision tree, a random forest, a gradient-boosted tree, a multilayer perceptron, a one-vs-rest, a Naive Bayes, etc. Further, the second classifier model may be trained upon using machine learning algorithms. Further, the machine learning algorithms may include a set of instructions that may be executed by the processing device to train the second classifier model. Further, the classification of the annotated regulatory document may be based on the first classification codes generated by the first classifier model.

Further, at 906, the method 900 may include a step of storing, using a storage device, the annotated regulatory document in association with each of the plurality of first classification codes and the plurality of second classification codes in a database.

Figure 10:
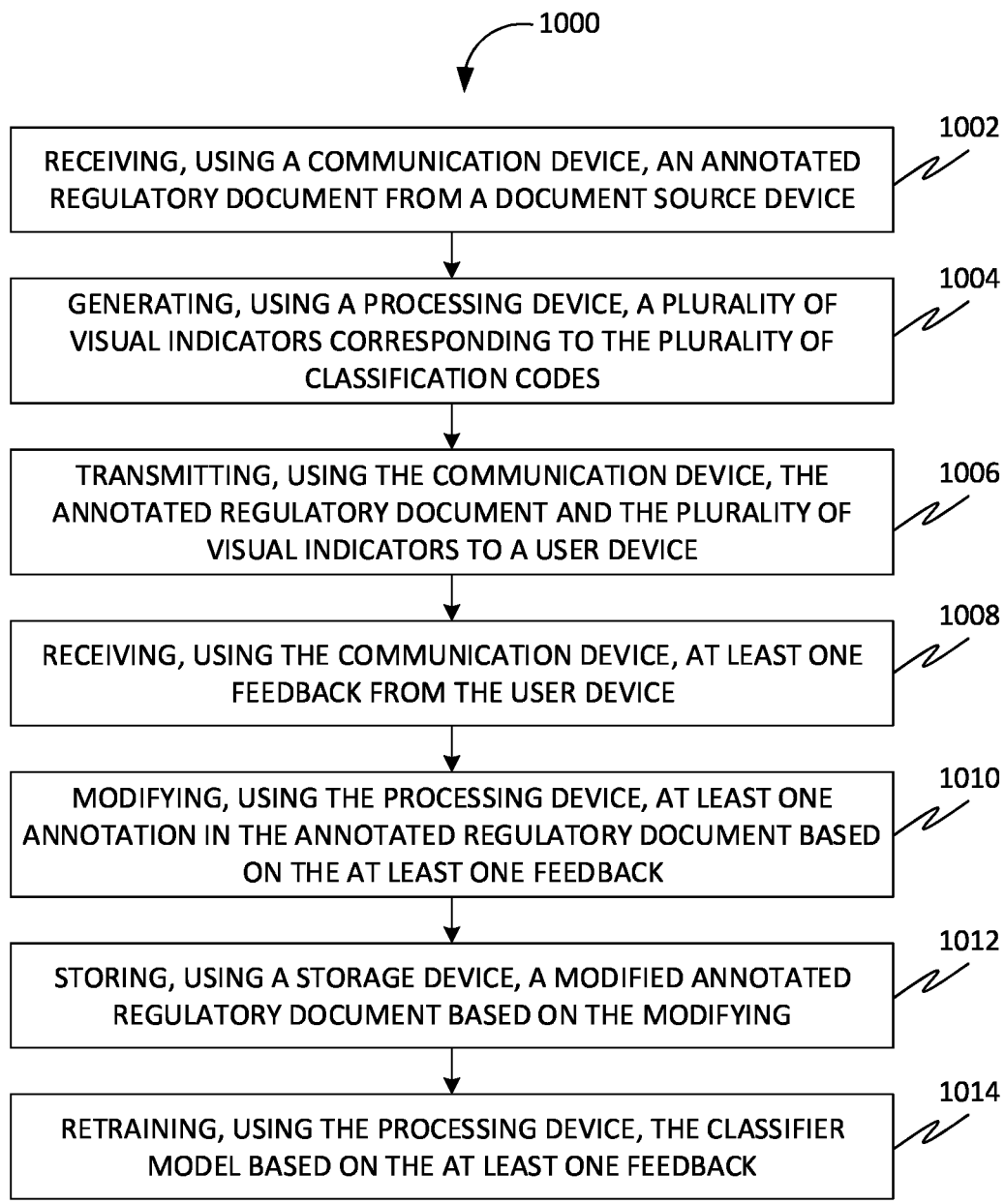
FIG. 10 is a flowchart of a method to facilitate the generation of visual indicators corresponding to a plurality of portions, in accordance with some embodiments.

FIG. 10 is a flowchart of a method 1000 to facilitate the generation of visual indicators corresponding to a plurality of portions, in accordance with some embodiments. Accordingly, at 1002, the method 1000 may include a step of receiving, using a communication device, an annotated regulatory document from a document source device. Further, the annotated regulatory document comprises a plurality of portions and a plurality of annotations corresponding to the plurality of portions. Further, the each annotation includes a classification code corresponding to a respective portion of the plurality of portions. Further, the annotated regulatory document may include a regulatory document with the plurality of annotations corresponding to the plurality of sections. Further, the plurality of portions may include a word, a sentence, or a paragraph. Further, the plurality of portions may include a title, a section heading, a section, a sub-section heading, and a sub-section. In another embodiment, the each classification code may include a title, a section heading, a section, a sub-section heading, and a sub-section corresponding to the plurality of portions. In some embodiments, the each classification code may include enforcement action violation, penalty (currency), respondent (business/entity), etc. Further, the regulatory document may be associated with a regulatory authority. Further, the regulatory authority may include an institution and an organization that may enforce regulations associated with occupation, health, safety, technology, etc. Further, the regulatory document may include a dossier, an application, a modification, a filing, and so on. Further, the regulatory document may be associated with a structure. Further, the structure may include a layout of textual content. Further, the layout may be associated with text indentation of the regulatory document. Further, the document source device may be associated with the regulatory authority. Further, the document source device may include a document repository (such as a server, a database). Further, the document source device may include a smartphone, a mobile, a tablet, a laptop, a computer, and so on. Further, the user may include an individual, an institution, and an organization that may own the regulatory document.

Further, at 1004, the method 1000 may include a step of generating, using the processing device, a plurality of visual indicators corresponding to the plurality of classification codes. Further, rendering of the plurality of portions is based on the plurality of visual indicators. Further, the plurality of visual indicators may include colored text, highlighted text, animated text, text font characteristics, etc. Further, the text font characteristics may include a bold character, an italicized character, an underline character, etc.

Further, at 1006, the method 1000 may include a step of transmitting, using a communication device, the annotated regulatory document and the plurality of visual indicators to a user device. Further, the user device may be associated with a user. Further, the user may include an individual, an institution, and an organization that may want to receive the annotated regulatory document and the plurality of visual indicators. Further, the user device may include a smartphone, a tablet, a laptop, a personal computer, and so on.

Further, at 1008, the method 1000 may include a step of receiving, using the communication device, at least one feedback from the user device. Further, the at least one feedback may include a modifying/updating at least one annotation of the plurality of the annotations.

Further, at 1010, the method 1000 may include a step of modifying, using the processing device, at least one annotation in the annotated regulatory document based on the at least one feedback.

Further, at 1012, the method 1000 may include a step of storing, using a storage device, a modified annotated regulatory document based on the modifying.

Further, at 1014, the method 1000 may include a step of retraining, using the processing device, the classifier model based on the at least one feedback. Further, the classifier model may be trained for classifying the plurality of portions based on the at least one feedback. Further, retraining of the classifier model may correspond to more accurate classification of the plurality of portions of the regulatory document.

Figure 11:
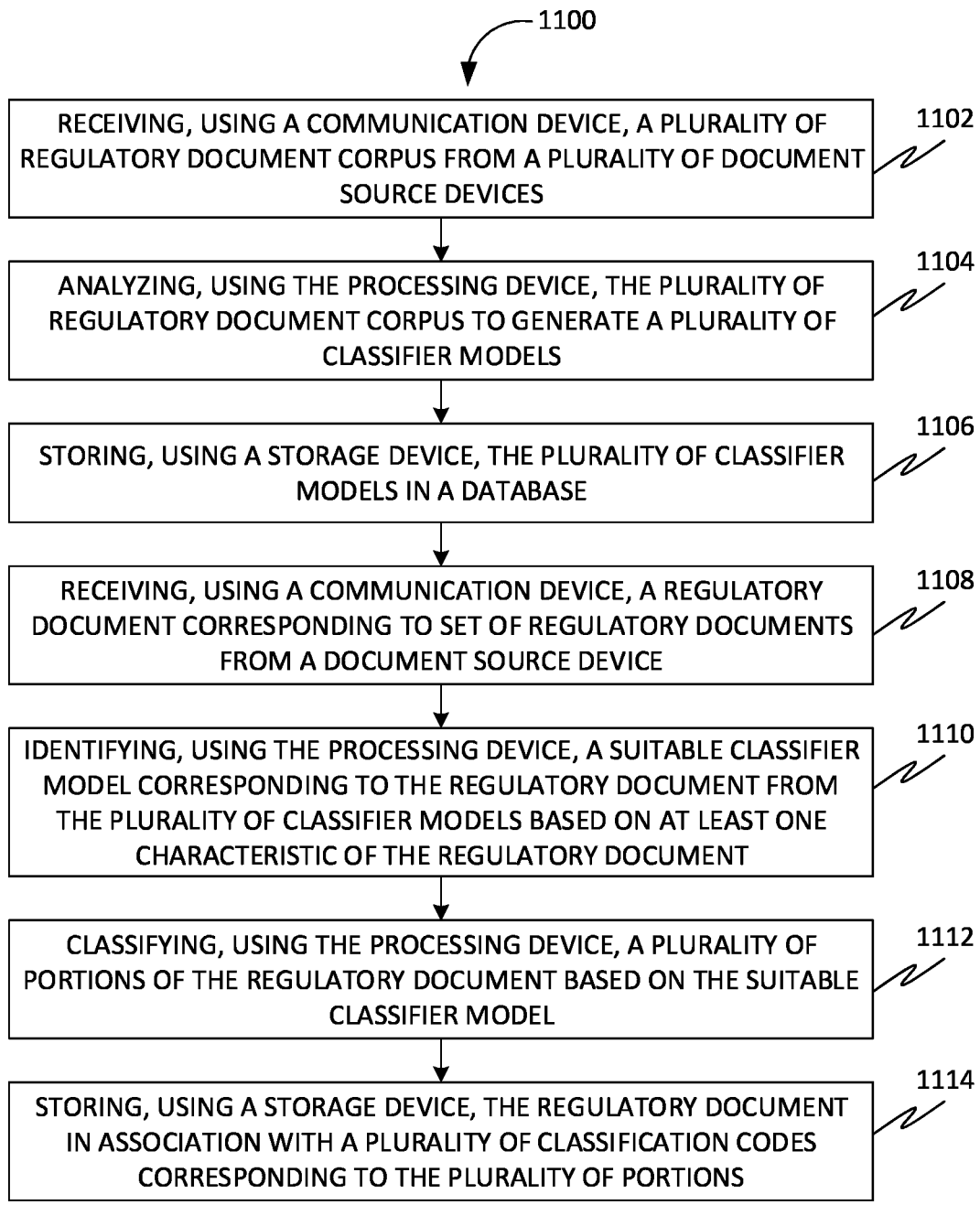
FIG. 11 is a flowchart of a method to facilitate the generation of a classifier model corresponding to a regulatory document corpus, in accordance with some embodiments.

FIG. 11 is a flowchart of a method 1100 to facilitate the generation of a classifier model corresponding to a regulatory document corpus, in accordance with some embodiments. Accordingly, at 1102, the method 1100 may include a step of receiving, using a communication device, a plurality of regulatory document corpus from a plurality of document source devices. Further, a regulatory document corpus of the plurality of regulatory document corpus may be associated with a regulatory authority. Further, the regulatory document corpus may include one or more regulatory documents. Further, a regulatory document of the one or more regulatory documents may include a dossier, an application, a modification, a filing, and so on. Further, the regulatory document may be associated with a structure. Further, the structure may include a layout of textual content. Further, the layout may be associated with the text indentation of the regulatory document. Further, the regulatory authority may include an institution and an organization that may enforce regulations associated with occupation, health, safety, technology, etc. Further, a document source device of the plurality of document source devices may be associated with the regulatory authority that may include a document repository (such as a server, a database). Further, the document source device may include a smartphone, a mobile, a tablet, a laptop, a computer, and so on that may be used by a user to upload the regulatory document. Further, the user may include an individual, an institution, and an organization that may want to classify the regulatory document.

Further, at 1104, the method 1100 may include a step of analyzing, using the processing device, the plurality of regulatory document corpus to generate a plurality of classifier models. Further, the plurality of regulatory document corpus may be analyzed using machine learning algorithms. Further, the machine learning algorithms may include a set of instructions to facilitate the analysis of the plurality of regulatory document corpus. Further, the analysis of the regulatory document corpus may facilitate the generation of a classifier model corresponding to the regulatory authority. Further, a classifier model of the plurality of classifier models may be configured for classifying the plurality of regulatory document corpus. Further, the classifier model may include a decision tree, a random forest, a gradient-boosted tree, a multilayer perceptron, a one-vs-rest, a Naive Bayes, etc.

Further, at 1106, the method 1100 may include a step of storing, using a storage device, the plurality of classifier models in a database.

Further, at 1108, the method 1100 may include a step of receiving, using a communication device, a second regulatory document corresponding to a set of regulatory documents from a document source device. Further, the second regulatory document may be associated with a regulatory authority. Further, the regulatory second document may include a dossier, an application, a modification, a filing, and so on. Further, the second regulatory document may be associated with a structure. Further, the structure may include a layout of textual content. Further, the layout may be associated with text indentation of the regulatory document. Further, the regulatory authority may include an institution and an organization that may enforce regulations associated with occupation, health, safety, technology, etc. Further, the document source device may be associated with the regulatory authority that may include a document repository (such as a server, a database, etc.). Further, the document source device may include a smartphone, a mobile, a tablet, a laptop, a computer, and so on that may be used by a user to upload the regulatory document. Further, the user may include an individual, an institution, and an organization that may want to classify the regulatory document. Further, the set of regulatory documents may include a plurality of regulatory documents that may be associated with a particular regulatory authority.

Further, at 1110, the method 1100 may include a step of identifying, using a processing device, a suitable classifier model corresponding to the regulatory document from the plurality of classifier models based on at least one characteristic of the regulatory document. Further, the suitable classifier model may facilitate the classification of the content of the regulatory document associated with the regulatory authority.

Further, at 1112, the method 1100 may include a step of classifying, using the processing device, a plurality of portions of the regulatory document based on the suitable classifier model. Further, the plurality of portions comprises a title, a section heading, a section, a section heading, a subsection heading, and a sub-section. Further, at least one of the title, the section heading, the section, the sub-section heading, and the sub-section is characterized by one or more co-located white-spaces. Further, the white spaces may include one or more characters that may represent horizontal or verticals spaces in typography. Further, the one or more characters may include space characters, return characters, etc.

Further, at 1114, the method 1100 may include a step of storing, using a storage device, the regulatory document in association with a plurality of classification codes corresponding to the plurality of portions. Further, the plurality of classification codes may include enforcement action violations, penalties (currency), respondents (business/entity), etc. of the regulatory document that may be classified by the suitable classifier model.

Figure 12:
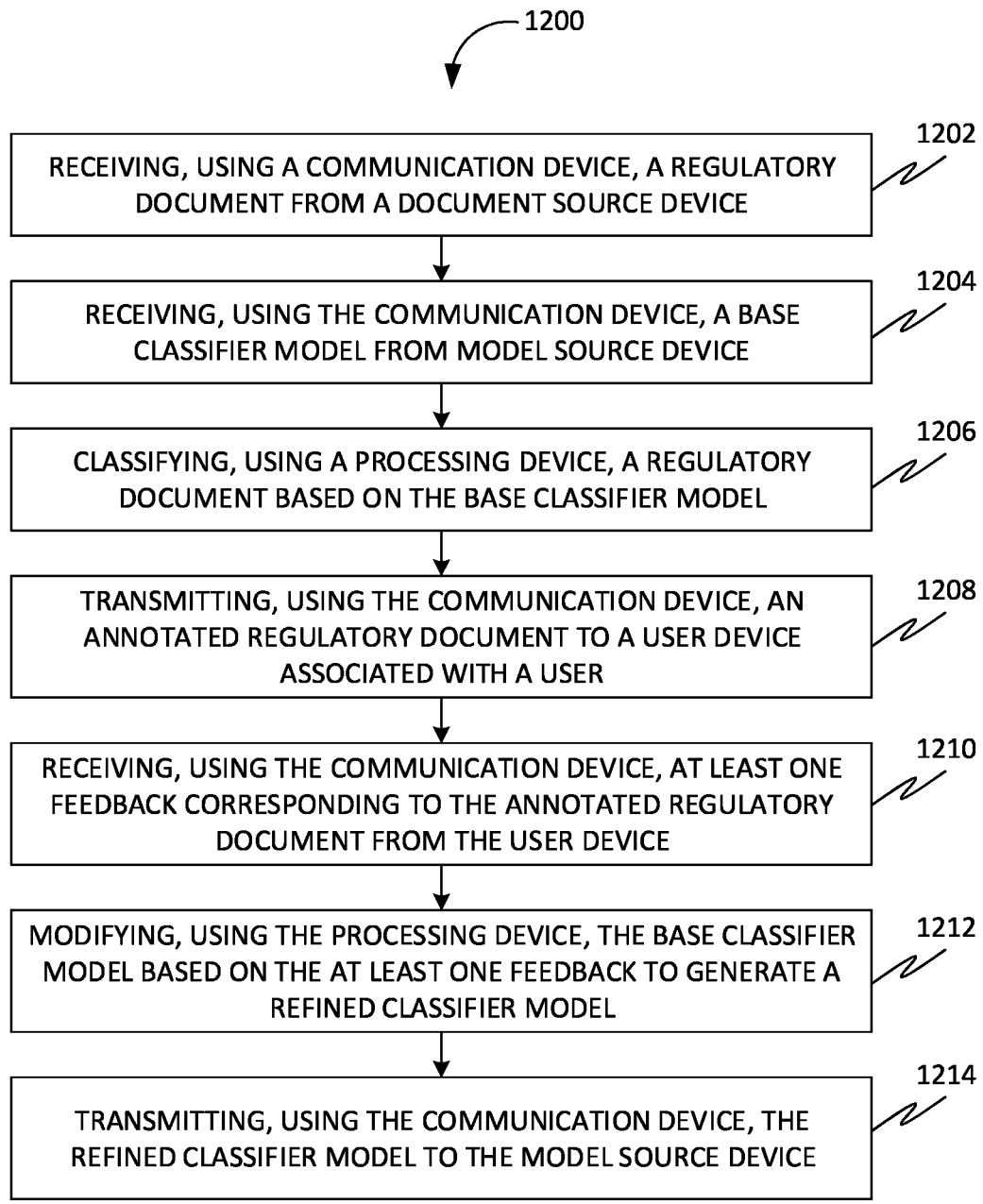
FIG. 12 is a flowchart of a method to facilitate the modification of a base classifier model based on user feedback, in accordance with some embodiments.

FIG. 12 is a flowchart of a method 1200 to facilitate the modification of a base classifier model based on user feedback, in accordance with some embodiments. Accordingly, at 1202, the method 1200 may include a step of receiving, using a communication device, a regulatory document from a document source device. Further, the regulatory document may be associated with a regulatory authority. Further, the regulatory document may include a dossier, an application, a modification, a filing, and so on. Further, the regulatory document may be associated with a structure. Further, the structure may include a layout of textual content. Further, the layout may be associated with the text indentation of the regulatory document. Further, the regulatory authority may include an institution and an organization that may enforce regulations associated with occupation, health, safety, technology, etc. Further, the document source device may be associated with the regulatory authority that may include a document repository (such as a server, a database). Further, the document source device may include a smartphone, a mobile, a tablet, a laptop, a computer, and so on that may be used by a user to upload the regulatory document. Further, the user may include an individual, an institution, and an organization that may want to classify the regulatory document.

Further, at 1204, the method 1200 may include a step of receiving, using a communication device, a base classifier model from a model source device. Further, the base classifier model may include a machine learning model that may be configured for classifying the regulatory document. Further, the base classifier model may include a decision tree, a random forest, a gradient-boosted tree, a multilayer perceptron, a one-vs-rest, a Naive Bayes, etc. Further, the base classifier model may be trained upon using machine learning algorithms. Further, the machine learning algorithms may include a set of instructions that may be executed by the processing device to train the classifier model. Further, the model source device may include a database, a server, etc. that may be configured to store the base classifier model.

Further, at 1206, the method 1200 may include a step of classifying, using a processing device, a regulatory document based on the base classifier model. Further, the regulatory document may include a plurality of portions. Further, the plurality of portions may include a title, a section heading, a section, a sub-heading section, and a sub-section. Further, at least one of the title, the section heading, the section, and the sub-section may be characterized by one or more co-located white-spaces. Further, the white spaces may include one or more characters that may represent horizontal or vertical spaces in typography. Further, the one or more characters may include space characters, return characters, etc. Further, classifying the regulatory document may include classifying the plurality of portions of the regulatory document.

Further, at 1208, the method 1200 may include a step of transmitting, using the communication device, an annotated regulatory document to a user device associated with a user. Further, the annotated regulatory document may include a plurality of annotations corresponding to the plurality of portions. Further, the plurality of annotations may include a plurality of classification codes corresponding to a respective portion of the plurality of the portions. Further, the plurality of classification codes may be assigned by the regulatory authority to the regulatory document. Further, the plurality of classification codes may include enforcement action violations, penalties (currency), respondents (business/entity), etc. Further, in another embodiment, the classification codes may include titles, section headings, sections, sub-section headings, and sub-sections. Further, the user device may include a smartphone, a tablet, a laptop, a personal computer, and so on. Further, the user may include an individual, an institution, and an organization that may want to classify the regulatory document.

Further, at 1210, the method 1200 may include a step of receiving, using the communication device, at least one feedback corresponding to the annotated regulatory document from the user device. Further, the at least one feedback may include a modification associated with the classification code corresponding to the respective portion.

Further, at 1212, the method 1200 may include a step of modifying, using the processing device, the base classifier model based on the at least one feedback to generate a refined classifier model. Further, the refined classifier model may be configured to classify the regulatory document more accurately as compared to the base classifier model.

Further, at 1214, the method 1200 may include a step of transmitting, using the communication device, the refined classifier model to the model source device.

Figure 13:
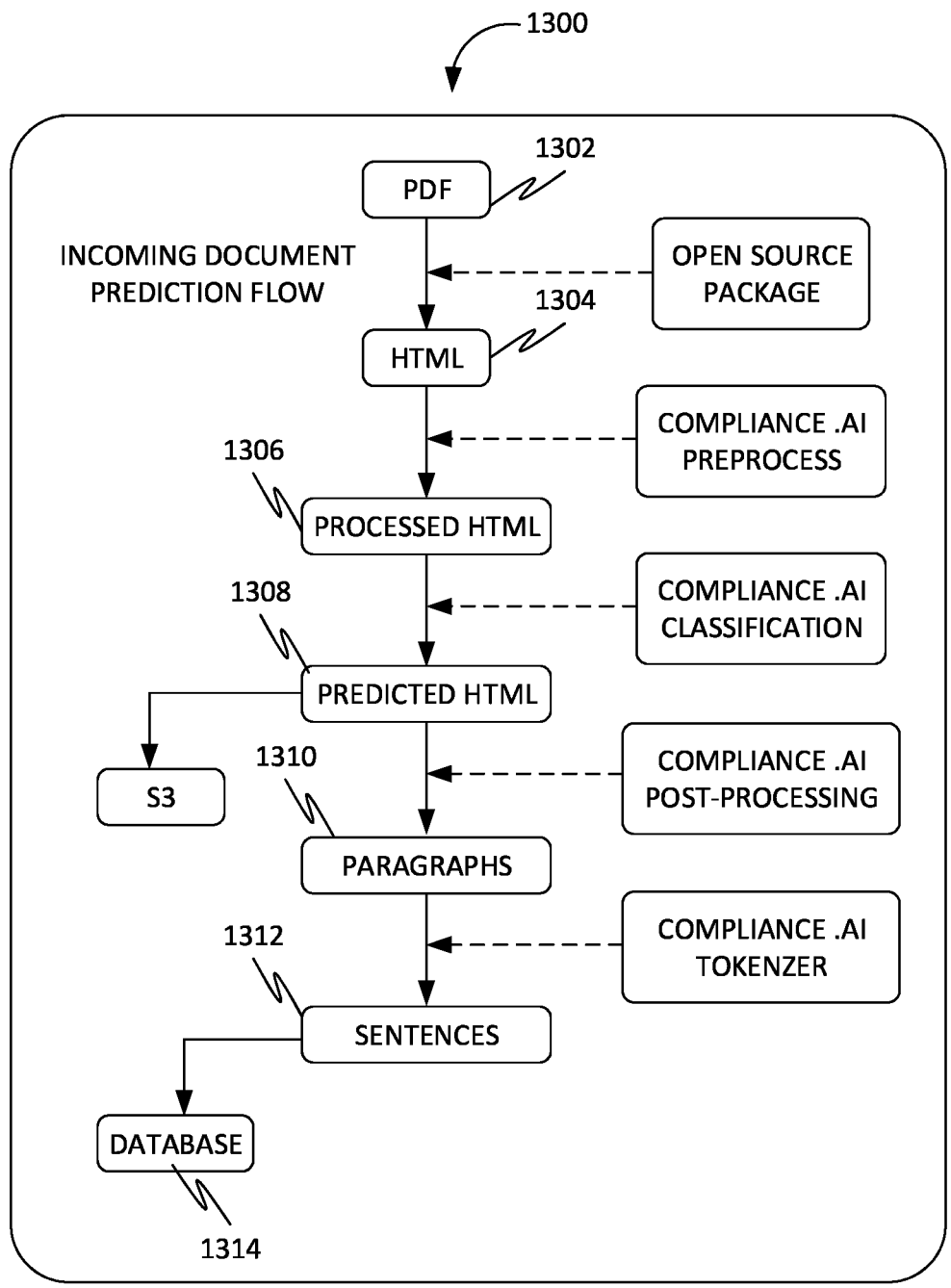
FIG. 13 is a flow diagram of a method to facilitate the classification of portions of a regulatory document, in accordance with some embodiments.

FIG. 13 is a flow diagram of a method 1300 to facilitate the classification of portions of a regulatory document, in accordance with some embodiments. Accordingly, at 1302, the method 1300 may include a step of receiving a regulatory document. Further, the regulatory document may be associated with a format. Further, the format may include a .PDF.

Further, at 1304, the method 1300 may include the conversion of the regulatory document into a HTML format. Further, at 1306, the method 1300 may include preprocessing the HTML regulatory document to generate a processed HTML regulatory document.

Further, at 1308, the method 1300 may include classification of the preprocessed HTML regulatory document to generate a predicted HTML regulatory document. Further, the predicted HTML regulatory document may classify a plurality of portions. Further, the plurality of portions may include a sentence, paragraph. Further, at least one of the paragraph may be characterized by one or more co-located white-spaces.

Further, at 1310, the method 1300 may include a step of post-processing the predicted HTML regulatory document.

Further, at 1312, the method 1300 may include a step of tokenization that may break the plurality of portions of the predicted HTML regulatory document into smaller meaningful elements such as sentences.

Further, at 1314, the method 1300 may include storing the predicted HTML regulatory document and the sentences.

Figure 14:
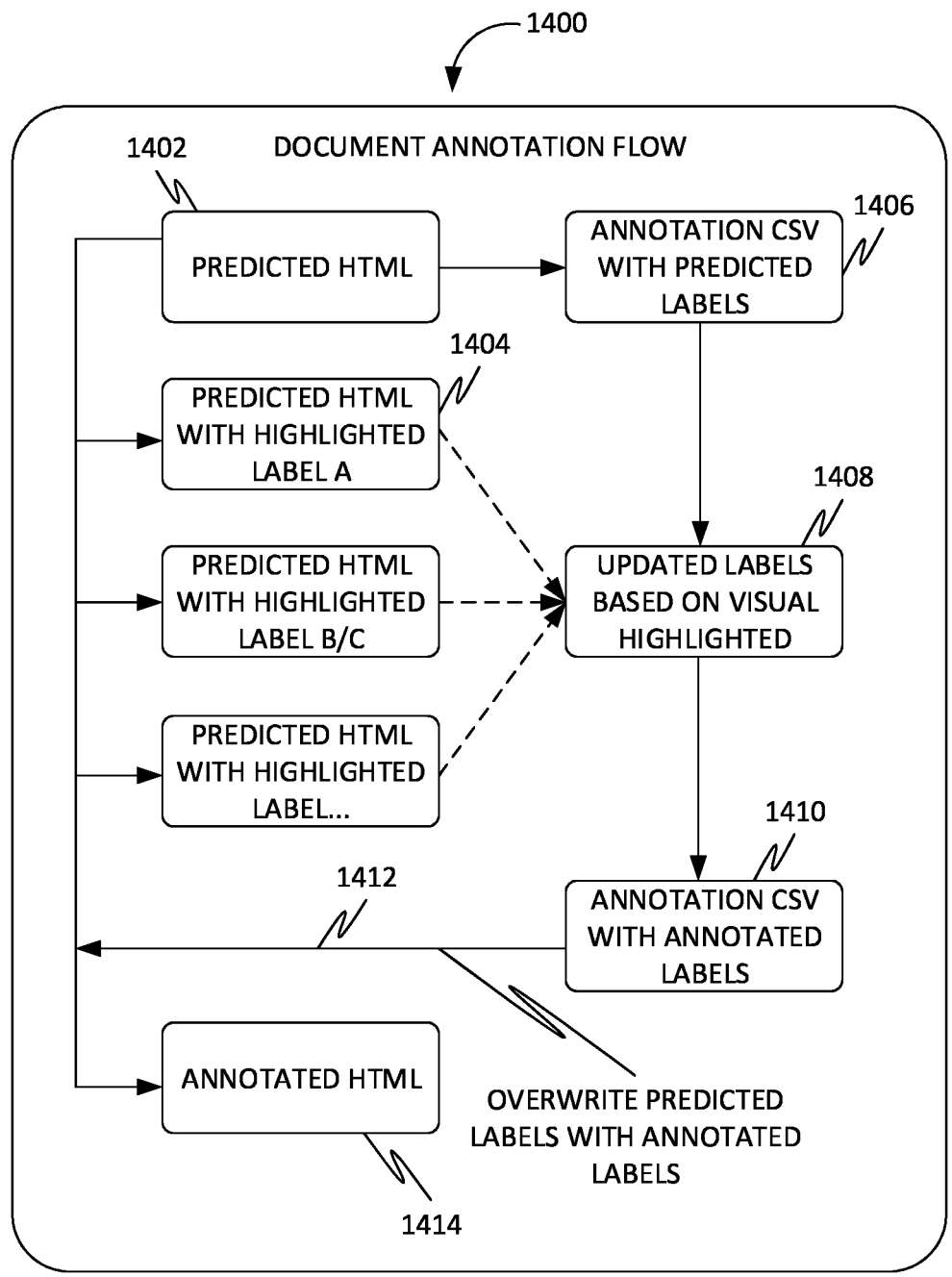
FIG. 14 is a flow diagram of a method to facilitate generation and updating of highlighted labels, in accordance with some embodiments.

FIG. 14 is a flow diagram of a method 1400 to facilitate generation and updating of highlighted labels, in accordance with some embodiments. Accordingly, at 1402, the method 1400 may include a step of receiving a predicted HTML regulatory document.

Further, at 1404, the method 1400 may include receiving the predicted HTML regulatory document with highlighted predicted labels associated with a plurality of portions of the predicted HTML regulatory document. Further, the plurality of portions may include a title, a section, a section heading, a sub-section heading, a sub-section, etc.

Further, after 1402, at 1406, the method 1400 may include the predicted HTML regulatory document converted to annotation CSV with predicted labels.

Further, at 1408, the method 1400 may include a step of receiving updates associated with the highlighted predicted labels based on visual highlighting.

Further, at 1410, the method 1400 may include a step of generating annotation CSV with annotated labels associated with a user. Further, the user may include an individual, an institution, and an organization that may want to update the highlighted predicted labels.

Further, at 1412, the method 1400 may include a step of overwriting highlighted predicted labels with annotated labels.

Further, at 1414, the method 1400 may include a step of generating an annotated HTML document. Further, the annotated HTML document may include the annotated labels.

Figure 15:
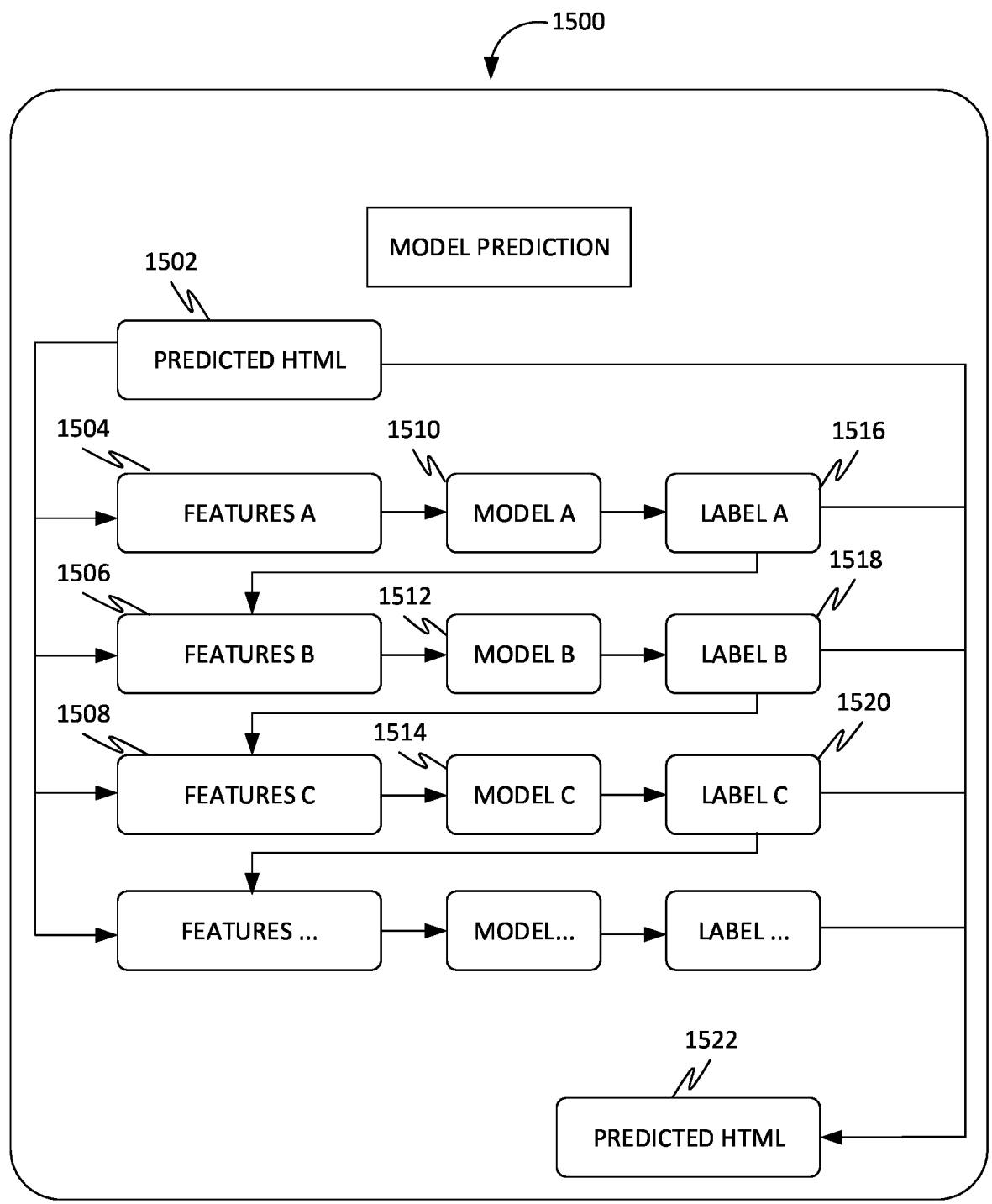
FIG. 15 is a flow diagram of a method to facilitate the prediction of a classifier model corresponding to a regulatory document corpus, in accordance with some embodiments.

FIG. 15 is a flow diagram of a method 1500 to facilitate the prediction of a classifier model corresponding to a regulatory document corpus, in accordance with some embodiments. Accordingly, at 1502, the method 1500 may include a regulatory document corpus that may be associated with a regulatory authority. Further, the regulatory document corpus may include a processed HTML document. Further, the processed HTML document may include a plurality of features 1504-1508. Further, the plurality of features 1504-1508 may include characteristics associated with a structure of the processed HTML document. Further, the structure may include a layout of textual content. Further, the layout may be associated with text indentation of a plurality of portions of the processed HTML document. Further, the plurality of portions may include a title, a section heading, a section, a sub-section heading, sub-section heading. Further, a suitable classifier model may be identified from a plurality of classifier models 1510-1514 based on the structure of the processed HTML document. Further, the suitable classifier model may facilitate the classification of the processed HTML document. Further, the suitable classifier model of the plurality of classifier models 1510-1514 may include a decision tree, a random forest, a gradient-boosted tree, a multilayer perceptron, a one-vs-rest, a Naive Bayes, etc.

Further, the method 1500 may include a step of classifying the plurality of portions of the processed HTML document based on the suitable classifier. Further, classifying the plurality of portions may include generating one or more labels 1516-1520 corresponding to a respective portion. Further, the one or more labels 1516-1520 may include enforcement action violations, penalties (currency), respondents (business/entity), etc.

Further, at 1522, the method 1500 may include a step of generating a predicted HTML document corresponding to the processed HTML document. Further, the predicted HTML document may include the one or more labels 1516-1520 associated with the plurality of portions of the processed HTML document corresponding to the predicted HTML document. Further, the one or more labels 1516-1520 may be the plurality of classification codes.

Figure 16:
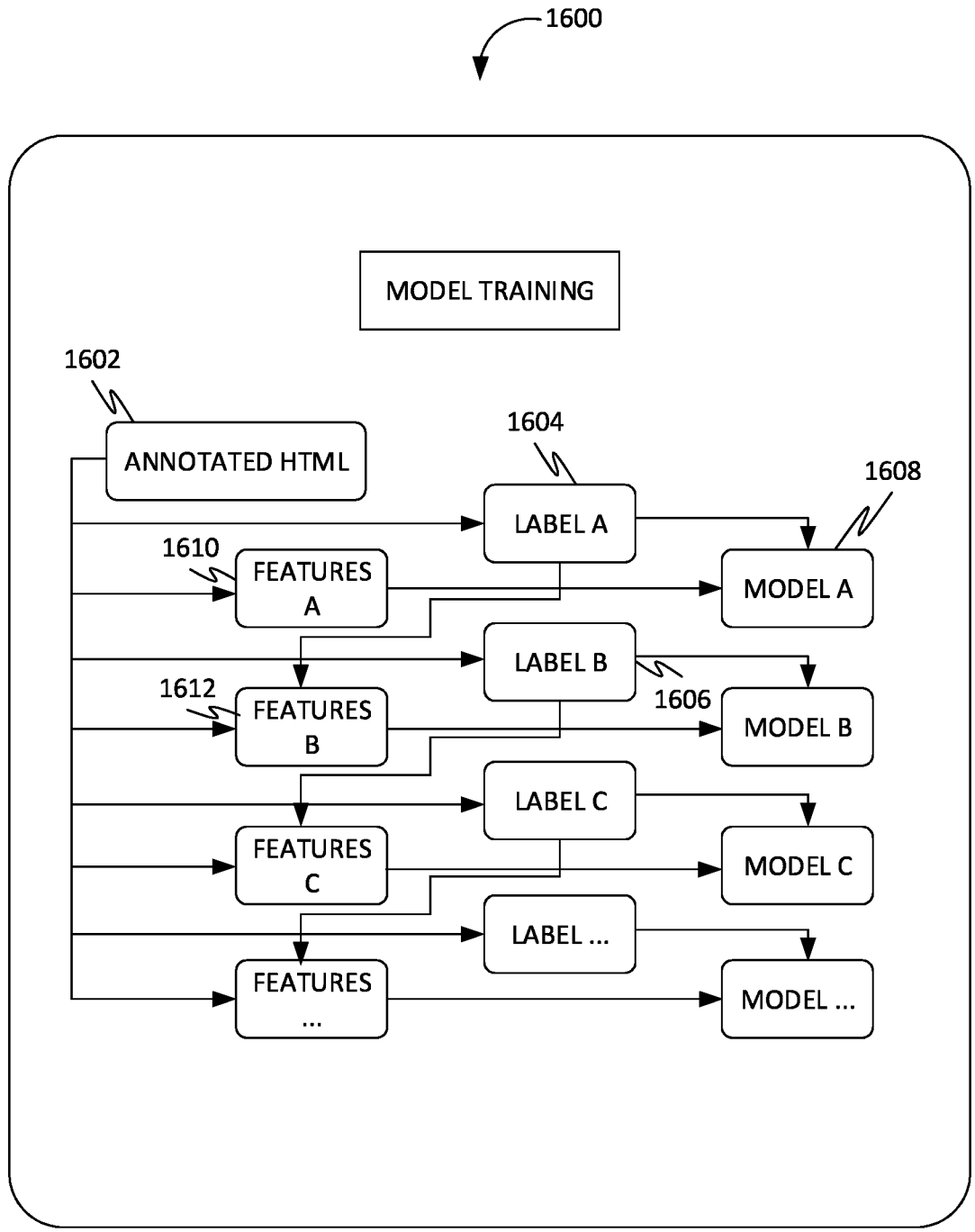
FIG. 16 is a flow diagram of a method to facilitate the training of the suitable classifier model based on feedback by the user, in accordance with some embodiments.

FIG. 16 is a flow diagram of a method 1600 to facilitate the training of the suitable classifier model based on feedback by the user, in accordance with some embodiments. Accordingly, at 1602, the method 1600 may include a step of receiving an annotated HTML document. Further, the annotated HTML document may include a plurality of features 1610-1612. Further, the annotated HTML document may include modified labels corresponding to a respective portion of the plurality of portions of the processed HTML document by the user. Further, the modified labels may include a plurality of labels 1604-1606. Further, the plurality of labels 1604-1606 may include enforcement action violations, penalties (currency), respondents (business/entity), etc. Further, the suitable classifier model may be modified based on the feedback by the user to generate a refined classifier model 1608. Further, the feedback may include a modification of the plurality of labels 1604-1606. Further, the refined classifier model 1608 may classify the processed HTML document more accurately as compared to the suitable classifier model. Further, the plurality of labels 1604-1606 may be the plurality of classification codes.

Figure 17:
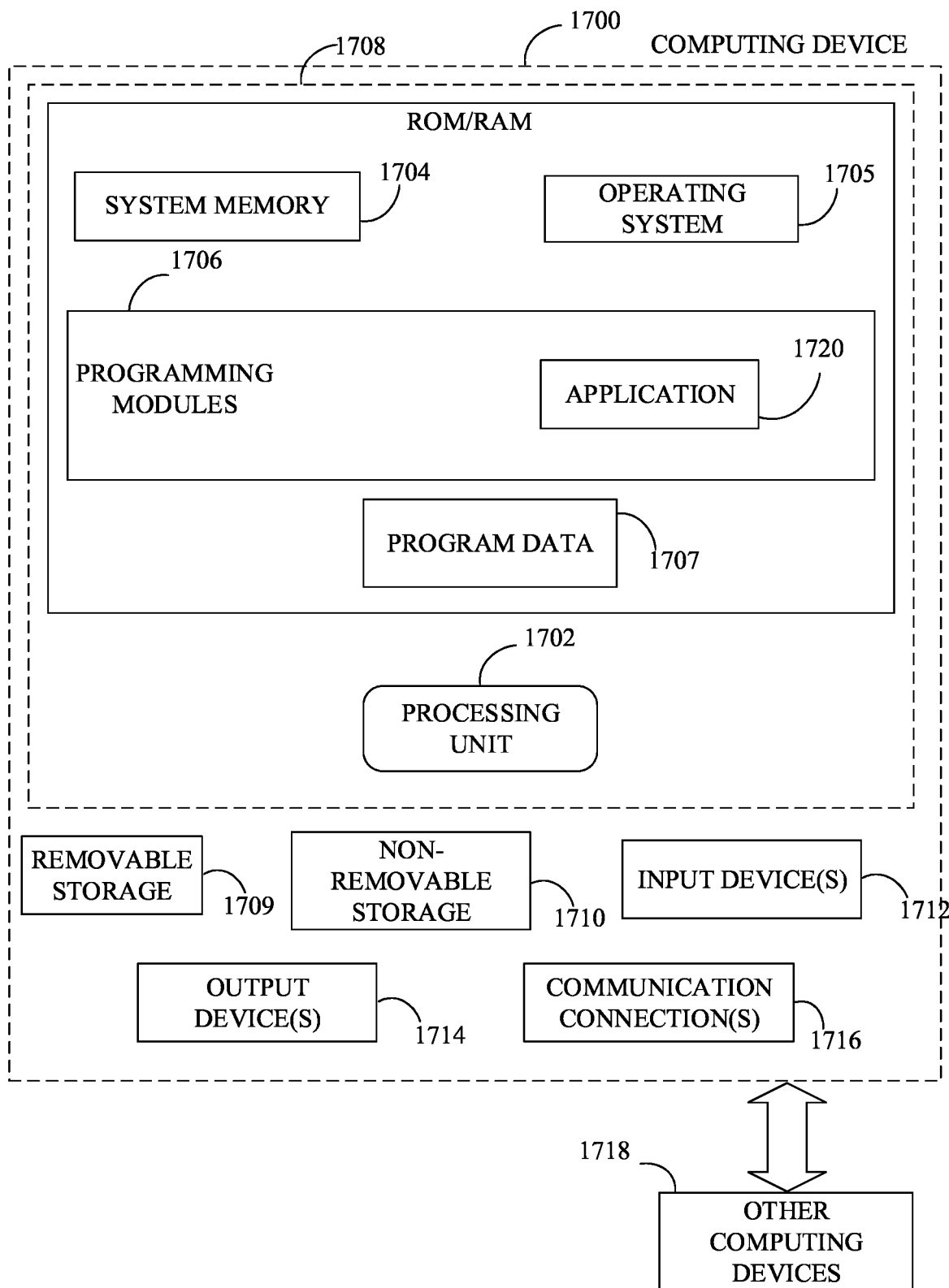
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating classification of portions of a regulatory document, the method comprising:
  receiving, using a communication device, the regulatory document from at least one device, wherein the regulatory document is associated with a structure, wherein the structure comprises a layout of content of the regulatory document, wherein the layout comprises at least one of an indent and a white space associated with the portions of the regulatory document, wherein the regulatory document is associated with a source format;
  converting, using a processing device, the regulatory document from the source format to a preferred format;
  analyzing, using the processing device, the regulatory document of the preferred format based on the converting;
  identifying, using the processing device, a plurality of portions of the regulatory document based on the analyzing;
  classifying, using the processing device, the plurality of portions using a classifier model into a plurality of classification codes based on the identifying, wherein the classifying of the plurality of portions is based on the at least one of the indent and the white space associated with the plurality of portions;
  generating, using the processing device, a visually annotated regulatory document based on the classifying, wherein the annotated regulatory document comprises the plurality of portions and the plurality of classification codes associated with the plurality of portions;
  transmitting, using the communication device, the annotated regulatory document to the at least one device;
  storing, using a storage device, the annotated regulatory document and the classifier model;
  analyzing, using the processing device, the annotated regulatory document based on the generating;
  identifying, using the processing device, the plurality of classification codes associated with the plurality of portions based on the analyzing of the annotated regulatory document;
  generating, using the processing device, a plurality of visual indicators for the plurality of classification codes based on the identifying of the plurality of classification codes;
  applying, using the processing device, the plurality of visual indicators to the plurality of portions based on the plurality of classification codes of the plurality of portions;
  generating, using the processing device, a visually annotated regulatory document based on the applying;
  transmitting, using the communication device, the visually annotated regulatory document to the at least one device, wherein the at least one device is configured for presenting the visually annotated regulatory document;
  receiving, using the communication device, at least one feedback associated with at least one classification code of at least one portion of the plurality of portions from the at least one device based on the transmitting of the visually annotated regulatory document;
  modifying, using the processing device, the at least one classification code of the at least one portion based on the at least one feedback;
  generating, using the processing device, at least one modified classification code for the at least one portion based on the modifying;
  generating, using the processing device, a modified annotated regulatory document based on the generating of the at least one modified classification code;
  storing, using the storage device, the modified annotated regulatory document;
  receiving, using the communication device, at least one first feedback associated with the annotated regulatory document from the at least one device based on the transmitting of the annotated regulatory document;
  analyzing, using the processing device, the at least one first feedback;
  modifying, using the processing device, the classifier model based on the analyzing of the at least one first feedback;
  generating, using the processing device, a refined classifier model based on the modifying, wherein the refined classifier model is configured for classifying the regulatory document with a higher classification accuracy as compared to a classifying accuracy of the classifier model; and
  storing, using the storage device, the refined classifier model.

2. The method of claim 1, wherein the plurality of classification codes comprises at least two of a title, a section heading, a section, a sub-section heading, and a sub-section.

3. The method of claim 1 further comprising training, using the processing device, the classifier model based on a sample corpus of regulatory documents, wherein the classifier model comprises a machine learning model, wherein the classifier model is configured for classifying the plurality of portions based on the training.

4. The method of claim 1 further comprising retraining, using the processing device, the classifier model based on the at least one feedback, wherein the classifier model is configured for classifying the plurality of portions based on the retraining.

5. The method of claim 1 further comprising:
  receiving, using the communication device, a plurality of regulatory document corpus from a plurality of document source devices;
  analyzing, using the processing device, the plurality of regulatory document corpus;

generating, using the processing device, a plurality of classifier models based on the analyzing of the plurality of regulatory document corpus; and storing, using the storage device, the plurality of classifier models.

6. The method of claim 5 further comprising identifying, using the processing device, the classifier model of the plurality of classifier models based on the analyzing of the regulatory document, wherein the classifying of the plurality of portions using the classifier model into the plurality of classification codes is further based on the identifying of the classifier model.

7. The method of claim 1, wherein the white space comprises one or more characters representing at least one of a horizontal space and a vertical space in a typography of the regulatory document.

8. A system for facilitating classification of portions of a regulatory document, the system comprising:
a communication device;
a processing device;
a storage device;
the system being configured for:
receiving, using the communication device, the regulatory document from at least one device, wherein the regulatory document is associated with a structure, wherein the structure comprises a layout of content of the regulatory document, wherein the layout comprises at least one of an indent and a white space associated with the portions of the regulatory document, wherein the regulatory document is associated with a source format;
converting, using the processing device, the regulatory document from the source format to a preferred format;
analyzing, using the processing device, the regulatory document of the preferred format based on the converting;
identifying, using the processing device, a plurality of portions of the regulatory document based on the analyzing;
classifying, using the processing device, the plurality of portions using a classifier model into a plurality of classification codes based on the identifying, wherein the classifying of the plurality of portions is based on the at least one of the indent and the white space associated with the plurality of portions;
generating, using the processing device, a visually annotated regulatory document based on the classifying, wherein the annotated regulatory document comprises the plurality of portions and the plurality of classification codes associated with the plurality of portions;
transmitting, using the communication device, the annotated regulatory document to the at least one device;
storing, using the storage device, the annotated regulatory document and the classifier model;
analyzing, using the processing device, the annotated regulatory document based on the generating;
identifying, using the processing device, the plurality of classification codes associated with the plurality of portions based on the analyzing of the annotated regulatory document;
generating, using the processing device, a plurality of visual indicators for the plurality of classification codes based on the identifying of the plurality of classification codes;
applying, using the processing device, the plurality of visual indicators to the plurality of portions based on the plurality of classification codes of the plurality of portions;
generating, using the processing device, a visually annotated regulatory document based on the applying;
transmitting, using the communication device, the visually annotated regulatory document to the at least one device, wherein the at least one device is configured for presenting the visually annotated regulatory document;
receiving, using the communication device, at least one feedback associated with at least one classification code of at least one portion of the plurality of portions from the at least one device based on the transmitting of the visually annotated regulatory document;
modifying, using the processing device, the at least one classification code of the at least one portion based on the at least one feedback;
generating, using the processing device, at least one modified classification code for the at least one portion based on the modifying;
generating, using the processing device, a modified annotated regulatory document based on the generating of the at least one modified classification code;
storing, using the storage device, the modified annotated regulatory document;
wherein the communication device is further configured for receiving at least one first feedback associated with the annotated regulatory document from the at least one device based on the transmitting of the annotated regulatory document, wherein the processing device is further configured for:
analyzing the at least one first feedback;
modifying the classifier model based on the analyzing of the at least one first feedback; and
generating a refined classifier model based on the modifying, wherein the refined classifier model is configured for classifying the regulatory document with a higher classification accuracy as compared to a classifying accuracy of the classifier model, wherein the storage device is further configured for storing the refined classifier model.

9. The system of claim 8, wherein the plurality of classification codes comprises at least two of a title, a section heading, a section, a sub-section heading, and a sub-section.

10. The system of claim 8, wherein the processing device is further configured for training the classifier model based on a sample corpus of regulatory documents, wherein the classifier model comprises a machine learning model, wherein the classifier model is configured for classifying the plurality of portions based on the training.

11. The system of claim 8, wherein the processing device is further configured for retraining the classifier model based on the at least one feedback, wherein the classifier model is configured for classifying the plurality of portions based on the retraining.

12. The system of claim 8, wherein the communication device is further configured for receiving a plurality of regulatory document corpus from a plurality of document source devices, wherein the processing device is further configured for:
analyzing the plurality of regulatory document corpus; and generating a plurality of classifier models based on the analyzing of the plurality of regulatory document corpus, wherein the storage device is further configured for storing the plurality of classifier models.

13. The system of claim 12, wherein the processing device is further configured for identifying the classifier model of the plurality of classifier models based on the analyzing of the regulatory document, wherein the classifying of the plurality of portions using the classifier model into the plurality of classification codes is further based on the identifying of the classifier model.

14. The system of claim 8, wherein the white space comprises one or more characters representing at least one of a horizontal space and a vertical space in a typography of the regulatory document.

* * * * *